US008634482B2

(12) United States Patent
Towers et al.

(10) Patent No.: US 8,634,482 B2
(45) Date of Patent: Jan. 21, 2014

(54) HIGH POWER RADIO DEVICE COMMUNICATION PARAMETER CONFIGURATION AND METHODS USING LIMITED CONFIGURATION POWER

(75) Inventors: Kevin Towers, Fort Langley (CA); Peter de Buen, Coquitlam (CA); Frank Dietrich, Port Coquitlam (CA)

(73) Assignee: Cooper Technologies Company, Houston, TX (US)

( * ) Notice: Subject to any disclaimer, the term of this patent is extended or adjusted under 35 U.S.C. 154(b) by 861 days.

(21) Appl. No.: 12/619,708

(22) Filed: Nov. 17, 2009

(65) Prior Publication Data
US 2011/0116556 A1  May 19, 2011

(51) Int. Cl.
*H04L 27/00* (2006.01)
(52) U.S. Cl.
USPC ............ 375/259; 375/135; 375/136; 375/29; 375/316; 375/377; 455/73

(58) Field of Classification Search
USPC .......... 375/135, 136, 219, 259, 295, 316, 377
See application file for complete search history.

(56) References Cited

U.S. PATENT DOCUMENTS

| | | | |
|---|---|---|---|
| 7,986,657 B2 * | 7/2011 | Dobrowski et al. | 370/328 |
| 2005/0195775 A1 * | 9/2005 | Petite et al. | 370/338 |
| 2006/0069769 A1 * | 3/2006 | Dacosta | 709/224 |
| 2007/0021140 A1 * | 1/2007 | Keyes et al. | 455/522 |
| 2007/0080798 A1 * | 4/2007 | Jung et al. | 340/500 |
| 2008/0018496 A1 * | 1/2008 | Tanner et al. | 340/992 |
| 2010/0158251 A1 * | 6/2010 | Risley | 380/255 |
| 2010/0173637 A1 * | 7/2010 | Damnjanovic et al. | 455/447 |
| 2010/0292808 A1 * | 11/2010 | Berglund | 700/3 |
| 2011/0111700 A1 * | 5/2011 | Hackett | 455/41.2 |
| 2011/0282507 A1 * | 11/2011 | Oudalov et al. | 700/292 |

* cited by examiner

*Primary Examiner* — Hirdepal Singh
(74) *Attorney, Agent, or Firm* — Armstrong Teasdale LLP

(57) ABSTRACT

Radio devices such as long range radio devices configurable with a limited, configuration only power that is insufficient for normal operation of the radio are disclosed. Portable, limited power supplies allow effective configuration of radio devices at remote locations in the field. Methods of configuring radio devices are likewise disclosed.

22 Claims, 2 Drawing Sheets

HIGH POWER RADIO DEVICE COMMUNICATION PARAMETER CONFIGURATION AND METHODS USING LIMITED CONFIGURATION POWER

BACKGROUND OF THE INVENTION

The field of the invention relates generally to industrial radio radio devices for wirelessly communicating data, and more specifically to high, power, long range communication radio devices communicating data in a user-selected and specified network communication protocol associated with, for example, Supervisory Control and Data Acquisition (SCADA) systems.

SCADA systems are in widespread use for monitoring and controlling industrial processes of all types. Such SCADA systems typically include a number of remotely monitored locations including sensors, transducers, and other known elements utilized as control inputs to the SCADA system. Data and information associated with such elements at each of the remotely monitored locations can be wirelessly communicated with radio devices to other locations in the system in a communications network of radios, and ultimately are provided to a centralized computer system that manages data collection and allows coordinated control and operation of industrial processes in response to the data collected. Control commands can likewise be sent to the remote locations using a communications network including radio devices. In certain applications, the use of long range radio devices in the communication networks are a practical necessity, and thus have generally been widely adopted in certain industries for use with SCADA systems.

Long range radio devices may transmit and receive digital radio frequency signals to wirelessly transmit data and information over distances of 10-20 km, for example, and as such are relatively high power devices. Because of the relatively high power necessary to operate such long range devices, the radio devices are typically not battery powered devices, but rather are connected to line power supplies when installed.

The long range radio devices must be configured prior to installation with the necessary communication parameters to communicate in a SCADA system network according to a specified communications protocol. For example, the radios must be configured with the necessary network ID information for the communication nodes in which they are installed, must be equipped with a radio ID number compatible with but unique from the other radios in the communication network, and must be configured with communication protocol parameters in order to assemble valid signals for transmission on the network in the proper form for the specified protocol. In exemplary situations, the number of different communication parameters necessary for a specified protocol may easily reach thirty to forty or more different protocol parameters that each radio device must be configured with to effectively communicate on the network. Such radio devices are typically configured with the protocol parameters using appropriate software applications.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
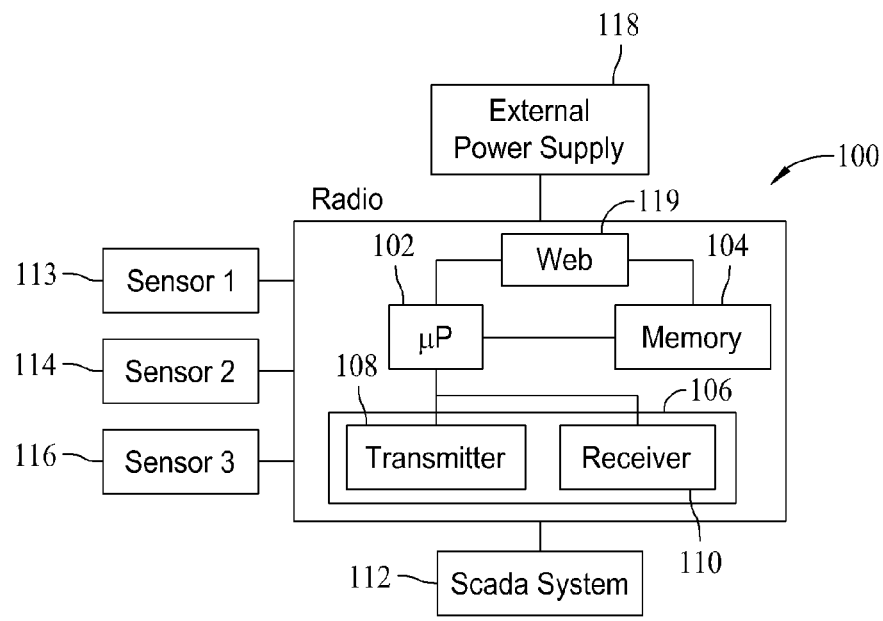
FIG. 1 is a schematic diagram of an exemplary long range radio device.

As previously mentioned, long range radio devices for use with SCADA systems tend to be high power devices that are typically powered by external power supplies (e.g., power line supplies or solar power supplies) rather than internal power supplies such as batteries. Because the long range radio devices have no internal power supply, they must be connected to external power sources to configure them with necessary network protocol parameters. This presents practical difficulties and inconvenience, however, for long range radio devices that are to be installed in remote locations. It would be desirable to configure the radios at or near their points of installation, but adequate power supplies are typically not available in remote areas. While the radio devices could perhaps be wired to an external power supply at the site of installation and then configured with the communication parameters, this is simply not practical in situations where radio devices are to be mounted on poles, secured in electrical cabinets, or installed in other areas that can be difficult to reach or access.

Additionally, long range radio devices are typically fully powered up in order to configure them with the necessary communication parameters. Ethernet connections, RS-232 Serial Port connections, and RS-485 Serial Port connections, for example, are typically used to configure the radio devices for a particular communications network using specialty software residing on a separate computer system, such as a laptop or notebook computer. This is problematic, however, for configuration of a long range radio device at its installation node in a remote location because the Ethernet connections, RS-232 Serial Port connections and RS-485 Serial Port connections also depend on an adequate power supply being available to power the device as it is being configured. As mentioned above, such a power supply typically is not present in the field, and connecting a radio device to a power line or other external power supply that the radio will utilize after its configuration and installation can be impractical when radio devices are to be mounted on poles, in electrical cabinets, or in other areas that are difficult to access.

Specifically, if radio devices were wired to an external power supply providing full operating power to the radio device at their points of installation, establishing RS-232 or RS-485 port connections between the radio devices and a computer including specialty software to configure the radio devices is impractical or perhaps impossible in many instances, even if the specialty software is loaded on a laptop or notebook computer. For example, RS-232 or RS-485 ports on the radio device may be difficult or impossible to access after the radio device is mounted at its installation point, possibly in an electrical panel, and power connections are established. Further, cable limitations, particularly a length of cable needed to reach certain radios after installation that may not be available to a technician or technicians in the field, would present another practical constraint on the ability of technicians to configure radios after they are installed and supplied with full operating power by an external power supply. Thus, even if configuration of radio devices were possible after being connected with full operating power via the external power supply, labor costs for installing the radio devices would no doubt be increased.

As a result of these and other difficulties at installation sites that may be in remote areas, industrial radio devices may be configured at a designated and centralized location. As such, the radio devices are temporarily supplied with full operating power, connected to a computer having specialty configuration software, disconnected from the temporary power supplies and the computer, and subsequently transported to their various installation points. Configuring multiple radios with Ethernet connections and RS-232 or RS-485 connections, however, can be time consuming. It would be desirable to configure the radios using higher data transfer rates than conventional Ethernet connections and RS-232 or RS-485 ports allow.

When multiple pre-configured radios are transported together to be installed at various points of installation in the field, some confusion may also result regarding which radio is to be installed where in the field. That is, when technicians or installers are given a group of pre-configured radios to install in different locations, it is possible that questions may arise regarding which of the radios has been configured for each particular point of installation. Installation of a radio configured for use at one location but mistakenly installed at another location is typically correctable once it is detected, but can lead to undesirable costs and delay in achieving a full and satisfactory operation of a SCADA system. While attentive installers typically take measures to avoid such mistakes, they are not completely effective to avoid human error.

These and other difficulties are resolved by the exemplary embodiments of systems and methods below allowing long range radio devices to be effectively configured at or near their points of installation. This is achieved by providing long range devices that may be configured with network protocol communication parameters using a limited amount of power that is less than the full operating power of the radio device in normal use. Furthermore, the limited power may be supplied to the radio devices for configuration by another battery powdered device such as a laptop or notebook computer using a Universal Serial Bus (USB) connection. Still further, the radio device may be provided with an internal web server facilitating the configuration of the radio device with software accessible on the Internet. As such, the laptop or notebook computer need not include any specialized software, and higher data transfer rates via the USB connection facilitates a quicker configuration time in comparison to relatively slower RS-232 or RS-485 connections. Installers may accordingly rather quickly and efficiently configure the radio devices with network protocol information at any convenient location, including but not limited to points of installation in remote areas.

FIG. 1 is a schematic diagram of an exemplary long range industrial radio device 100. In the example shown, the radio device 100 is a programmable processor-based device including a processor 102 and a memory storage 104 wherein executable instructions, commands, and control algorithms, as well as other data and information such as communication network and protocol parameters required to satisfactorily operate the radio device 100 are stored. The memory 104 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown, but also other equivalent element such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The radio device 100 also includes a radio transmission element 106 that may include a transmitter 108 and a receiver 110. Alternatively, the transmitter 108 and received 110 may be combined into a single device referred to as a transceiver. The radio transmission element 106 sends and receives wireless data signals using known radio frequency transmission techniques. The data and information communicated with the radio transmission element 106 may be processed, formatted or converted into an appropriate communications protocol by the processor 102 utilizing information stored in the memory 100. For example, digital radio frequency signals may be transmitted and received using a specified protocol for the contents of the data messages sent in a particular communications network. Parameters for network communication may include data and information such as the size (i.e., the number of bits) of the data signals transmitted, the order of bits constituting the message, unique radio identifiers, hardware and software version codes, security codes, diagnostic codes and the like as those in the art will appreciate. As mentioned above, in some communication networks, thirty to forty different communication parameters must be known by the radio device 100 in order to effectively communication on a particular network using a specified communications protocol that may be selected by the end user or operator for a specific industrial application.

Additionally, desirable signal processing such as amplification, filtering, signal conversion (e.g., DC to AC conversion), and diagnostic procedures may be performed. Algorithms and instructions for executing specific communication protocols and procedures are stored in the memory 104, for example, and executed by the processor 102 to communicate information over a communication network, which may be part of a SCADA system 112. The radio device 100 may be part of a remote terminal unit (RTU) in a SCADA system 112.

The radio device 100 is connected to inputs such as sensors, transducers and like monitoring or condition detecting elements associated with the industrial process being monitored and controlled (collectively referred to herein as "sensors") indicated by the reference numerals 113 and 114 and an output element 116 such as a control device for an industrial process. The sensors 113 and 114 generate and provide control feedback signals indicative of the state of the industrial process, and the control device 116 provides for adjustment of the monitored process at the point of the sensors 113 and 114 to effect changes in the state. A variety of sensors are known to detect various aspects of the monitored state which may correspond to a machine state, a component state, a process step, or other parameter of interest to the SCADA system. As examples only, monitored aspects of an industrial process detected by the sensors 113 and 114 may include electrical states or conditions (e.g., current or voltage conditions), mechanical states or conditions (e.g., position, velocity, acceleration, stress and strain), a physical state or condition (e.g., temperature, phase, or formulation), an environmental state or condition (e.g., noise, vibration, air quality) and other states of conditions of interest.

A variety of control devices 116 are also known and familiar to those in the art, any of which may be utilized to respond to abnormal or unaccepted states or conditions at various points in the industrial process. The control device 116 may include or may coordinate, switching elements, machine controls, component controls to affect a change in state or condition without human intervention, interrupt the industrial process to avoid undesirable results stemming from detected states or conditions, or activate alarm elements and features for response and decisions to be made by human persons. It is understood that the control element 116 may be in the same or different physical location as the sensors 113, 114. That is, the control element 116 may be located upstream or downstream from the sensors 113, 114 in the industrial process such that in practice the sensors 113, 114 and the control element 116 may not be connected to the same radio device 100.

Furthermore, while two sensors 113, 114 and one control device 116 are shown, it is understood that other numbers of sensors and control devices may alternatively be connected to the radio device 100 or to radio devices 100 with like effect. In different embodiments, the sensors 113 and 114 may be hard wired to the radio device 100, may wirelessly communicate with the radio device 100, or be combinations of hard-wired and wireless devices. Typically, a number of radios are distributed throughout the industrial process, with each radio connected to different sensors to provide control inputs and feedback throughout the industrial process, and the radios communicating in a network using the specified communication protocol.

In addition, instead of dedicated sensors and control devices as shown, the functions of these devices could be combined in one or more input/output devices that are capable of bi-directional communication with the radio device or devices 100. In any event, data and information collected via the sensors and/or control devices is collected by each radio device 100 in the SCADA system 112, and communicated to a remote location using the specified communications protocol. Additionally, information such as control commands may be received by the radio device 100 from a remote location according to the specified communication protocol, and sent to the control device 116.

The radio device 100 may be configured as a long range radio device capable of transmitting and receiving radio frequency signals wirelessly over distances of 10-20 km, for example. Compared to other radio devices, the radio device 100 may be considered a relatively high power device designed to broadcast signals over extended distances. An external power supply 118 is therefore connected to the radio device 100, as batteries and other energy storage devices would not provide sufficient power levels to continuously operate the radios over extended time periods as SCADA systems sometimes require. Therefore, as used herein, the external power supply 118 is specifically distinguished from an internal or otherwise on-board power supply such as a battery or other power storage device carried on the radio device 100.

In different embodiments, the external power supply 118 may be an alternating current (AC) or direct current (DC) power supply coupled to the radio device 100 with an external power line or cable, for example. Generally permanent, hard wired power connections may be established using known screw terminal connections or other suitable techniques for such relatively high powered devices. Additionally, transformers, power amplifiers and the like may be provided in the device 100 to step or step down power supplied from the external supply 114 as necessary, as well as AC to DC or DC to AC converters that may be desirable.

As shown in FIG. 1, the radio device 100 may be further provided with a web server 119 that may be used to download the appropriate algorithms, instruction and information necessary for operation of the radio device from a remotely located computer system including appropriate radio configuration software. Thus, the radio device 100 may be rather quickly and conveniently configured with communication parameters for a particular network communication protocol over the Internet or other computer network connection. Specialty software need not be provided in an on-site computer to configure the radio device 100 with network communication parameters.

Figure 2:
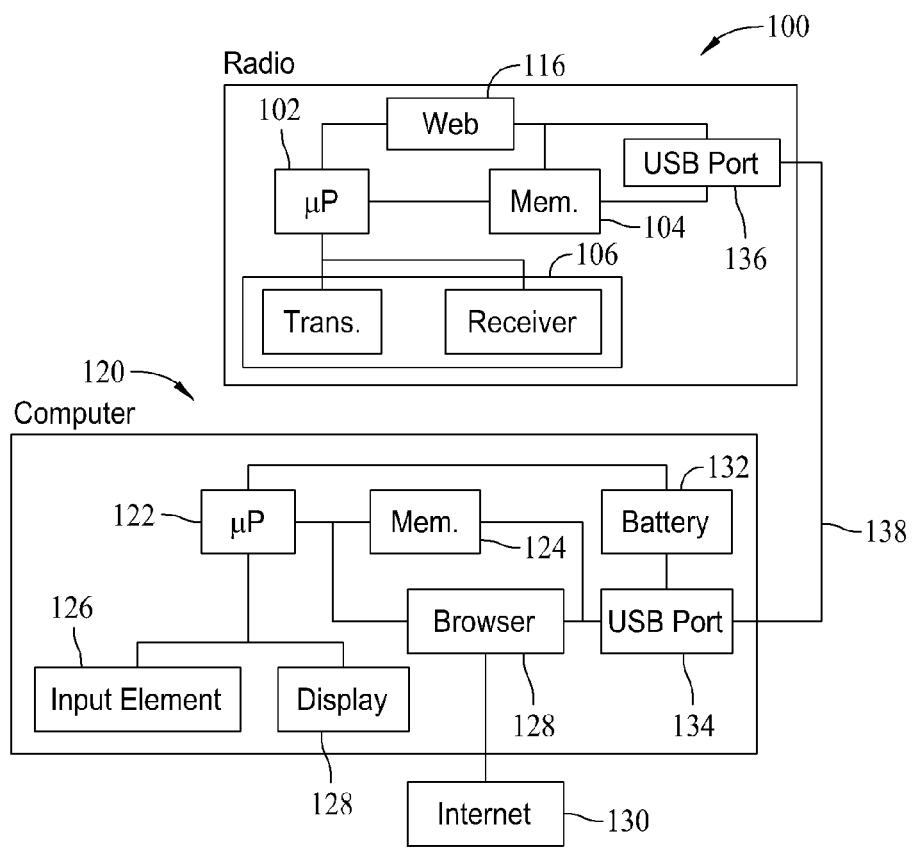
FIG. 2 schematically illustrates the long range radio device connected to a limited power supply configuration device for radio protocol parameter configuration purposes.

FIG. 2 schematically illustrates the long range radio device 100 connected to a limited power supply configuration device 120 such as a laptop or notebook computer in an exemplary embodiment.

Accordingly, and as shown in the example of FIG. 2, the limited power supply configuration device 120 is also a processor-based device including a processor 122 and a memory 124 for storing executable instructions, commands, and control algorithms for operation of the device 120. The limited power supply configuration device 120 also includes an input element 126 such as a keyboard or mouse and a display 128 presenting information to a user. The limited power supply configuration device 120 may also include a web browser 128 facilitating connection to the Internet 130 to view and retrieve information from a remotely located computer system also connected to the Internet 130 and including specialty software for configuring the radio device 100 with network communication and protocol parameters. As mentioned above, the specialty software need not be provided on the device 120 itself, but rather may accessed from a remotely located computer system using the Internet.

The limited power supply configuration device 120 also includes an on-board power supply 132 such as a rechargeable battery unit or battery pack. Such power supplies 132 are known and familiar to those in the art and accordingly are not separately described herein. The limited power supply configuration device also includes a universal serial bus (USB) port 134 for connection to an external device such as the radio device 100 that also includes a USB port 136. A connecting cable 138 commonly known as a USB cable completes a physical connection between the limited power supply configuration device 120 and the radio device 100. The USB port 134 and the cable 138 also allow power transmission from the on-board power supply 132 of the limited power supply configuration device 120 to the radio device 100 for radio configuration purposes. Power transmitted between the devices 120 and 100, however, is substantially less than the full power required by the radio device 100 in operation.

As one example, but not the only example, the limited power supplied by the device 120 to the radio device 100 for configuration purposes only may correspond to a current supply of about 50 mA or less, while the full operating power for the radio device 100 in normal, fully functional use corresponds to about 300 mA of current. It is recognized, however, that greater or less amounts of limited power, and also greater or lesser amounts of full power, may exist in other exemplary embodiments without deviating from the scope and spirit of the invention. In exemplary embodiments, the full power of the device in use as a long range radio for a SCADA system is much larger than the limited power supplied solely for configuration purposes. Alternatively stated, the limited, configuration only power is much lower that than the normal full power for the radio in ordinary use.

As such, the power transmitted from the device 120 via the USB port 134 and cable 138, and accordingly received at the USB port 136 of the radio device 100, is insufficient for normal operation of the radio device 100, but is sufficient to configure the radio device 100 with the appropriate protocol information and parameters via the Internet 130. Thus, as used herein, the term "limited power" is specifically contrasted with normal or operating power in which the radio device 100 is fully functional. As such, sufficient but limited power may be provided only for network communication and protocol configuration purposes by the limited power supply configuration device 120, and full power for normal use is provided by the external power supply 118. Alternatively stated, the radio may be configured in a low power mode with a temporary connection to a portable power supply, such as the device 120, and then connected permanently to a generally fixed and permanent external power supply, such as the supply 118 for fully functional use of the radio device 100 in a high power mode.

Figure 3:
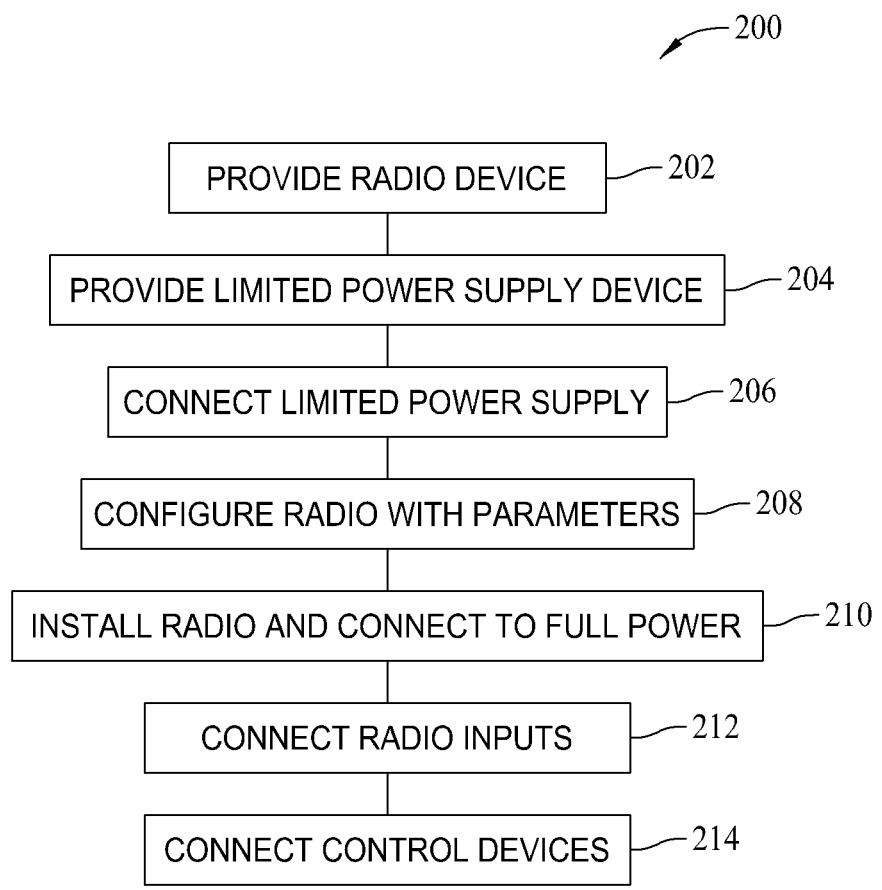
FIG. 3 is an exemplary flowchart of a method of configuring a long range radio device with network communication protocol parameters.

FIG. 3 is an exemplary flowchart 200 of a method of configuring a long range radio device such as the radio device 100. As shown in FIG. 3, the method includes at step 202 and 204 the steps of providing a radio device (such as the radio device 100 described above in relation to FIG. 1) and providing a limited power configuration device (such as the device 120 described above in relation to FIG. 2).

At step 206, the limited power configuration device is connected to the radio device, and the radio device is configured with the network communication and protocol parameters using the limited power configuration device as explained above in relation to FIG. 2. In the example described, the connection is made using USB ports provided in each of the radio device and the limited power configuration device, the limited power configuration device supplies configuration power to the radio device, and the configuration is accomplished via accessing specialty software via an Internet or other computer network connection.

Once configured, the radio device is disconnected from the limited power configuration device and at step 210 is permanently installed at its designated location and connected to full power supplied by a permanent and fixed external power supply as shown in FIG. 1.

At steps 212 and 214, the radio inputs such as sensors and the like are connected to the radio device, and control devices are likewise connected as also shown in FIG. 1. As previously mentioned, the sensor and control device connections may be established with hard-wired connections, wireless communication techniques, or combinations thereof.

The benefits of the exemplary embodiments disclosed are numerous and include at least the following.

Since the limited power supply configuration device 120 may be a portable device such as a laptop or notebook computer, for example, it may be conveniently transported in the field to an approximate point of installation for the radio device 100. At that location, the limited power supply configuration device 120 may be connected to the radio device, and may supply the limited power needed to configure the radio device 100 for its particular installation point. Existing Wi-Fi connections and the like may allow the limited power supply configuration device 120 to connect to the Internet 130 and retrieve information for download to the radio device 100 using known techniques and protocols, including but not limited to Ethernet protocols.

When the radio device 100 is to be installed in a remote area, the limited power supply configuration device 120 may be conveniently transported with a vehicle together with the radio device, and the radio device may accordingly be configured with network communication parameters just prior to and generally at its installation location. The vehicle, in turn, may include power adapters and the like allowing the limited power supply configuration device 120 to receive power or be charged by the vehicle electrical power system in use. Such a vehicle may also be equipped with satellite equipment and the like so that Internet communications may be established even in remote installation areas.

Because the network configuration of the radio device 100 may be conveniently accomplished at an installation site of a radio device 100, confusion and possible mistake of installing a pre-configured radio device at the wrong location is avoided.

Additionally, USB data transfer rates are generally higher than conventional Ethernet connections and RS-232 or RS-485 connections. Thus, radio configuration may be accomplished in less time compared to conventional techniques.

Adaptations, however, are possible and in some embodiments the web server 119 in the radio device may be omitted. For example, the radio device may include a simple serial interface port such as an RS-232 and/or RS-485 port, and a simple command/response protocol over the serial channel may move simple serial data via a USB connection. In such a case the USB connection could still be used to provide limited power to a radio device for configuration only purposes, without requiring or involving a web server.

Limited, configuration only power may be conveniently provided with the USB ports and plug-in USB cables described. When the power supply 132 of the device 120 is depleted, it may be quickly and conveniently replaced with another limited power supply 132. In the case of laptop or notebook computer used as the limited power configuration device 100, a depleted battery unit may be quickly removed and easily replaced with another pre-charged battery unit. A number of radio devices 100 may therefore be effectively installed with minimal down time and reduced labor costs compared to conventional practices wherein each radio device would be individually wired to a full power supply for configuration purposes.

The benefits and advantages of the inventive concepts disclosed are now believed to be apparent from the various exemplary embodiments disclosed.

An exemplary embodiment of a radio device has been disclosed including a processor, a radio transmission element configured for long range communication of data when supplied with a full operating power, and a memory associated with the processor, the memory storing communication parameters necessary for the long range communication of data in a communications network using a specified communications protocol. The memory is configurable with the communication parameters with a limited, configuration only power level that is less than the full operating power for the radio device.

Optionally, the radio may further comprise a USB port, and the limited, configuration only power may be received with the USB port. The configuration only low power level may be supplied by a separately provided and external battery powered device. The battery powered device may be a computer device. The radio may further comprise a web server for configuring the memory with the communication parameters, and the web server is accessible via the USB port. An external device including a web browser may be connectable to the USB port for configuring the memory with the configuration only power level.

Also optionally, the communications network may be a SCADA communications network. The radio element may include at least one of a transmitter, a receiver and a transceiver. The radio transmission element may broadcast a digital radio frequency transmission signal. The configuration only power is supplied by a portable power source, and the full operating power is supplied by a fixed power source.

An exemplary embodiment of a processor-based radio device is also disclosed including a radio transmission element configured for long range communication of data when supplied with a full operating power, and a memory storing communication parameters necessary for the long range communication of data in a communications network using a specified communications protocol. The memory is configurable in a lower power mode that is insufficient for normal operation of the radio device, and the radio is fully functional and operable in high power mode.

Optionally, the processor-based radio device may further include a USB port, and in the low power mode the radio device receives limited, configuration only power via the USB port. The radio device may also include a web server for configuring the memory with the communication parameters via the USB port and a separately provided device including a web browser. The separately provided device may be a laptop or notebook computer. The separately provided device may include a battery, with the battery supplying the limited, configuration only power.

An exemplary method of configuring a radio device is also disclosed. The method includes: connecting a separately provided limited power configuration device to the radio device; supplying limited, configuration only power to the radio device via the limited power configuration device, wherein the limited configuration only power is substantially less than the full operating power of the radio device in normal operation; and configuring the radio device with network communication parameters using the limited, configuration only power.

Optionally, connecting the separately provided limited power configuration device to the radio device includes connecting a cable between a USB port on the limited power configuration device with a USB port on the radio device. The limited power configuration device may be a laptop or notebook computer, and configuring the radio device with network communication parameters using the limited, configuration only power may include establishing an Internet connection with the laptop or notebook computer, and downloading the network communication parameters to the radio device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A radio device for wirelessly communicating data in a communications network defined by a plurality of radio devices, the radio device comprising:
   a processor;
   a radio transmission element configured for long range communication of data when supplied with a full operating power after initial installation to the communications network whereafter the radio device may communicate with another one of the plurality of radio devices in the communications network; and
   a memory associated with the processor, the memory storing communication parameters necessary for the long range communication of data in the communications network using a specified communications protocol;
   wherein the memory is configurable with the communication parameters with a limited, configuration only power level that is less than the full operating power for the radio device prior to initial installation of the radio to the communications network and also prior to any communication with any of the other radio devices in the communication network.

2. The radio device of claim 1, further comprising a USB port.

3. The radio device of claim 2, wherein the limited, configuration only power is received with the USB port.

4. The radio device of claim 3, wherein the limited configuration only power level is supplied by a separately provided and external battery powered device.

5. The radio device of claim 4, wherein the battery powered device is a computer device.

6. The radio device of claim 2, further comprising a web server for configuring the memory with the communication parameters.

7. The radio device of claim 6, wherein the web server is accessible via the USB port.

8. The radio device of claim 7, wherein an external device including a web browser is connectable to the USB port for configuring the memory with the configuration only power level.

9. The radio device of claim 1, wherein the communications network is a SCADA communications network.

10. The radio device of claim 1, wherein the radio transmission element comprises at least one of a transmitter, a receiver and a transceiver.

11. The radio device of claim 1, wherein the radio transmission element broadcasts a digital radio frequency transmission signal.

12. The radio device of claim 1, wherein the limited configuration only power is supplied by a portable power source, and the full operating power is supplied by a fixed power source.

13. A processor-based radio device comprising:
    a radio transmission element configured for long range communication of data when supplied with a full operating power; and
    a memory storing communication parameters necessary for the long range communication of data in a communications network using a specified communications protocol;
    wherein the memory is configurable, prior to installation of the processor-based radio device in the communications network, with the communication parameters in a lower power mode that is insufficient for normal operation of the radio device to communicate on the network, and wherein the radio is fully functional and operable in a high power mode to communicate on the network thereafter.

14. The radio device of claim 13, wherein the processor-based radio device further comprises a USB port, and in the lower power mode the radio device receives limited, configuration only power via the USB port.

15. The radio device of claim 14, wherein the radio device includes a web server for configuring the memory with the communication parameters via the USB port and a separately provided device including a web browser.

16. The radio device of claim 15, wherein the separately provided device is a laptop or notebook computer.

17. The radio device of claim 15, wherein the separately provided device includes a battery, the battery supplying the limited, configuration only power.

18. A method of configuring a radio device for wireless communication on a communication network, the method comprising:
   prior to any communication with the network, connecting a separately provided, limited power configuration device to the radio device;
   supplying limited, configuration only power to the radio device via the limited power configuration device, wherein the limited configuration only power is substantially less than the full operating power of the radio device in normal operation to communicate on the network; and
   configuring the radio device with network communication parameters using the limited, configuration only power.

19. The method of claim 18, wherein connecting the separately provided limited power configuration device to the radio device comprises connecting a cable between a USB port on the limited power configuration device with a USB port on the radio device.

20. The method of claim 18, wherein the limited power configuration device is a laptop or notebook computer, and wherein configuring the radio device with network communication parameters using the limited, configuration only power comprises establishing an Internet connection with the laptop or notebook computer, and downloading the network communication parameters to the radio device.

21. A radio device comprising:
   a processor;
   a radio transmission element configured for long range communication of data in a communication network when supplied with a full operating power; and
   a memory associated with the processor, the memory storing communication parameters necessary for the long range communication of data in a communications network using a specified communications protocol;
   wherein the processor, prior to any communication with the communication network, can be powered separately from the radio transmission element to configure the memory with the communication parameters and establish a capability to communicate over the communication network in a specified communications protocol.

22. The radio device of claim 21, wherein the processor can be powered with a limited, configuration only power level that is less than the full operating power for the radio transmission element to communicate on the communication network.

\* \* \* \* \*